US011169039B2

(12) United States Patent
Otte et al.

(10) Patent No.: US 11,169,039 B2
(45) Date of Patent: Nov. 9, 2021

(54) PRESSURE SENSOR DEVICE AND METHOD OF SENSING PRESSURE

(71) Applicant: Melexis Technologies NV, Tessenderlo (BE)

(72) Inventors: Laurent Otte, Brussels (BE); Appolonius Jacobus Van Der Wiel, Duisburg (BE); Jian Chen, Heist-op-den-Berg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 123 days.

(21) Appl. No.: 16/557,213

(22) Filed: Aug. 30, 2019

(65) Prior Publication Data

US 2020/0072692 A1 Mar. 5, 2020

(30) Foreign Application Priority Data

Aug. 31, 2018 (EP) .................................... 18192032

(51) Int. Cl.
*G01L 9/00* (2006.01)
*G01L 19/06* (2006.01)

(52) U.S. Cl.
CPC ........ *G01L 9/0054* (2013.01); *G01L 19/0627* (2013.01)

(58) Field of Classification Search
CPC ............. G01L 19/0627; G01L 19/0654; G01L 19/147; G01L 9/0048; G01L 9/0054
See application file for complete search history.

(56) References Cited

U.S. PATENT DOCUMENTS

| 6,005,275 A * | 12/1999 | Shinogi | G01L 9/0042 257/417 |
| 6,453,748 B1 * | 9/2002 | Pryor | G01L 9/0042 257/536 |
| 8,852,985 B2 * | 10/2014 | Cai | H01L 29/0649 438/53 |
| 2006/0192974 A1 * | 8/2006 | Li | G01D 5/266 356/496 |
| 2015/0362394 A1 * | 12/2015 | Shimoyama | G01L 9/0001 73/702 |
| 2016/0061677 A1 * | 3/2016 | Han | G01L 9/0045 257/415 |
| 2018/0186623 A1 * | 7/2018 | Vossough | G01L 9/0042 |

FOREIGN PATENT DOCUMENTS

| EP | 1561724 A1 | 8/2005 |
| JP | 2012154801 A | 8/2012 |

OTHER PUBLICATIONS

European Search Report for European Patent Application No. 18192032 dated May 29, 2019.

\* cited by examiner

*Primary Examiner* — Francis C Gray
(74) *Attorney, Agent, or Firm* — Harness, Dickey & Pierce, P.L.C.

(57) ABSTRACT

A pressure sensor device comprises a device package (110) arranged to define a cavity (116) having an opening for fluid communication with an internal volume thereof. The cavity (116) comprises a side wall (114, 115). An elongate pressure sensor element (100) is provided and has a proximal end (120) and a distal end (122). The side wall (114, 115) is arranged to hold fixedly the proximal end (120) of the pressure sensor element (100) therein so that the pressure sensor element (100) is cantilever-suspended from the side wall (114, 115) within the cavity (116).

17 Claims, 3 Drawing Sheets

PRESSURE SENSOR DEVICE AND METHOD OF SENSING PRESSURE

FIELD

The present invention relates to a pressure sensor device of the type that, for example, comprises a pressure sensor disposed within a device package. The present invention also relates to a method of sensing pressure, the method being of the type that, for example, provides a pressure sensor within a device package.

BACKGROUND

Applications for pressure sensor devices are manifold. Indeed, considering just the automotive industry as one example, a range of pressure measuring applications exists for pressure sensor devices. However, such applications have associated challenges. This is particularly so for pressure sensing devices formed using so-called Micro Electromechanical Systems (MEMS) technologies where pressure measurements need to be made in the presence of high static pressures and/or fast pressure transients. For example, in automotive transmission systems, rapid pressure surges are known to occur as a result of a phenomenon known as "pressure cavitation". Such pressure changes can damage the pressure sensor device.

Frozen liquids also present design challenges for pressure sensor devices. In this respect, pressure sensor devices are known to be in contact with a medium the pressure of which is to be measured. However, when the medium freezes, fragile MEMS components of the pressure sensor device can become damaged. For example, so-called Selective Catalytic Reduction (SCR) systems employ a fluid comprising a substantial quantity of urea, which is dispersed in an exhaust system of a diesel-engined vehicle in order to reduce emissions by the vehicle of $NO_x$ gases into the atmosphere, the fluid dispersed into the exhaust system reacting with the exhaust gas. However, the operating temperature range of the SCR systems typically include freezing temperatures, resulting in the urea component of the fluid freezing causing damage to the pressure sensor device. Water injection systems used by gasoline engines to enhance performance thereof by controlling combustion temperatures also employ pressure sensors that are similarly vulnerable. In this regard, the water can freeze risking damage to the MEMS-based pressure sensor devices used.

In order to provide pressure sensor devices with immunity to hostile pressure conditions and/or frozen media, it is known to make pressure sensor devices by providing a module comprising a metallic membrane, for example a stainless steel membrane, welded to peripheral walls of the module. The membrane carries a strain gauge in such a way that one side of the metallic membrane is in fluid communication with a medium to be measured. However, such pressure sensor devices do not lend themselves well to miniaturisation and lack the production scalability achievable by pressure sensor devices formed using MEMS technologies.

As an alternative, it is known to employ a so-called oil filled type of pressure sensor that comprises a chamber filled with an oil. Such pressure sensor devices can be formed using MEMS technologies, while providing greater immunity to high static pressures and fast pressure transients than conventional MEMS pressure sensor devices. However, such pressure sensor devices require relatively complex structures to support filling of the pressure sensor device with oil. Furthermore, in cost-sensitive high-volume markets, the oil-filled pressure sensor device design is cost prohibitive.

EP-A-2 657 669 relates to another backside exposed type pressure sensor device formed using MEMS technology, which comprises a MEMS sensing element, but avoids filling the device with oil. In order to withstand high pressures, die attach materials, for example hard glues or even solder, have to be carefully selected to prevent excessive strain on the MEMS sensing element. Relatively very thick glass layers are sometimes also used to serve as stress buffers. Features in the pressure channel of the pressure sensor device also have to be added to dampen pressure surges that can occur. Additionally, where the pressure sensor device is expected to be exposed to a medium that is expected to freeze at times, complex expandable structures are typically added to the pressure port of the pressure sensing device to absorb the stress induced by the frozen medium, thereby reducing the stress that is consequently transferred to the MEMS pressure sensor element. However, the backside exposed architecture employed can be unreliable, the pressure sensor device having many corners that concentrate stress leading to ruptures in the device and consequently failure of the device.

An alternative to using the backside exposed type of pressure sensor is a front side type of pressure sensor that is not filled with oil. However, such an architecture requires the sensor element and wire bonding to be protected from the medium, for example by overlying the die with a gel that isolates the sensor element from the medium while still transmitting the pressure in the medium to the pressure sensing element. Although immunity to freezing media is provided by this approach, the use of gel in this architecture cannot withstand high static or dynamic pressure levels, leading to the formation of bubbles in the gel and eventually failure of wire bonding of the pressure sensor device, which consequently results in electrical short-circuits in the liquid medium.

Furthermore, many applications require the measurement of absolute pressure. While backside exposed type pressure sensor devices employing MEMS technology are most suitable, they still suffer from the drawbacks mentioned above and require the membrane of the sensing element to be supported by a cap and so also require the cavity in which the cap is disposed to be shallow. Nevertheless, even if the membrane can withstand the high pressure levels, the silicon die is still exposed to very high pressures during use and so much of the structure of the pressure sensor device, for example the glass pedestal, the silicon die and the cap, can break when fast pressure transients occur or the medium freezes. Additionally, the backside exposed type of pressure sensor is typically formed from three wafers, increasing the manufacture complexity and hence cost. The use of three different wafers also adds a further design complication due to the possibility of thermal mismatches between the wafers.

US 2015/0128713 describes a pressure sensor comprising a sensor section carrying strain gauges, the sensor section being, for example, of rectangular parallelepiped shape. The sensor section is supported by a support member, an end of the sensor section being bonded on an edge of the support member so that the sensor section is cantilever-supported by the support member. Such an architecture is, however, vulnerable to sustaining damage from high static pressures, fast pressure transients and freezing of the medium in respect of which the pressure sensor is measuring the absolute pressure.

SUMMARY

According to a first aspect of the present invention, there is provided a pressure sensor device comprising: a device package arranged to define a cavity having an opening for fluid communication with an internal volume thereof, the cavity comprising a side wall; an elongate pressure sensor element having a proximal end and a distal end; wherein the side wall is arranged to hold fixedly the proximal end of the pressure sensor element therein so that the pressure sensor element is cantilever-suspended from the side wall within the cavity.

The side wall may substantially surround the proximal end of the pressure sensor element.

The pressure sensor element may be surrounded by a fluid. The fluid may be a liquid or a gelatinous material.

The pressure sensor element may comprise a closed cavity therein.

The pressure sensor element may comprise: a substrate layer; and a membrane layer disposed adjacent the substrate layer; the substrate layer and the membrane layer may cooperate to define the closed cavity.

The membrane may also separate, when in use, an internal volume of the closed cavity from a medium under test. An internal pressure of the closed cavity may define a reference pressure.

The substrate layer may be a glass layer and the membrane layer may be an etched silicon layer.

The substrate layer may be a first silicon layer and the membrane layer may be a second silicone layer.

The substrate layer may comprise a recessed portion formed therein; the recessed portion may define an open sensor element cavity portion.

The membrane layer may be arranged to close the open sensor element cavity portion.

The device package may comprise a mating surface for fixing to a counterpart mating surface when in use, wherein the mating surface may define the opening of the cavity of the device package and may be a keying surface. The keying surface may be a roughened surface.

The pressure sensor element may be a Micro Electromechanical Systems element.

The pressure sensor element may be formed from two wafers.

According to a second aspect of the invention, there is provided an absolute pressure sensor device comprising the pressure sensor as set forth above in relation to the first aspect of the invention.

According to a third aspect of the invention, there is provided an automotive vehicle comprising the pressure sensor device as set forth above in relation to the first or second aspect of the invention.

According to a fourth aspect of the invention, there is provided a method of sensing pressure, the method comprising: providing a device package defining a cavity having an opening for fluid communication with an internal volume thereof, the cavity having a side wall; and the side wall holding an elongate pressure sensor element fixedly at a first end of the pressure sensor element, thereby cantilever-suspending the pressure sensor element within the cavity.

It is thus possible to provide a device and method that enables robust pressure sensing despite hostile conditions, for example high static pressures in fluids, fast transient pressures and freezing media. In this respect, a membrane of the pressure sensor is not vulnerable to high pressures. The device and method also benefit from requiring fewer component parts and so lend themselves well to low-cost high-volume applications. Furthermore, the structure of the device enables protection of wire bonding connecting the pressure sensor element to the device package or to signal conditioning circuitry by overmoulding, thereby obviating the need for protective gels as a buffer between a medium and the pressure sensor element. Additionally, the device and method can be manufactured using MEMS technology so that hard glues or solder with glass pedestals to hold the pressure sensor are unnecessary. The structure of the device avoids formation of the pressure sensor with exposed internal corners where stress induced by the medium can concentrate.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
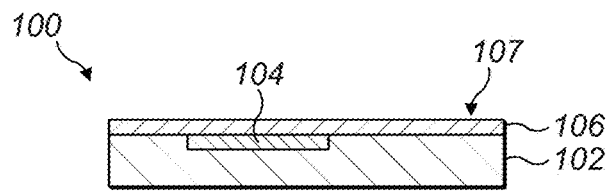
FIG. 1 is a schematic diagram of a pressure sensor element constituting part of an embodiment of the invention.

Throughout the following description, identical reference numerals will be used to identify like parts.

Figure 2:
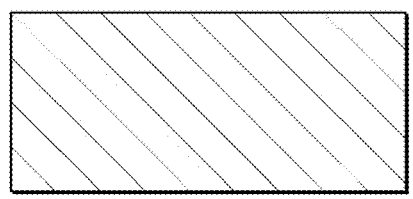
FIG. 2 is a schematic plan view of the pressure sensor element of FIG. 1.

Referring to FIG. 1, a pressure sensing element 100, for example a MEMS pressure sensor element, of a pressure sensor device comprises a substrate layer 102 having a cavity 104 formed therein and a surface membrane layer 106 sealingly disposed adjacent the substrate 102. The substrate 100 can be formed from any suitable material, for example silicon or glass. For some applications, use of a silicon substrate is advantageous, because silicon has desirable mechanical properties and/or permits integration of piezo resistors with the silicon substrate will allowing isolation thereof within the crystalline structure of the silicon. The surface membrane 106 can also be formed from any suitable material, for example silicon. Turning to FIG. 2, the pressure sensor element 100 is elongate and, in this example, of a generally rectangular shape. However, the skilled person will appreciate that other shapes can be employed.

Figure 3:
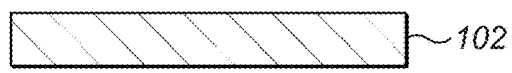
FIGS. 3 to 5 are schematic diagrams of different stages of formation of the pressure sensor element of FIG. 1.
Figure 4:
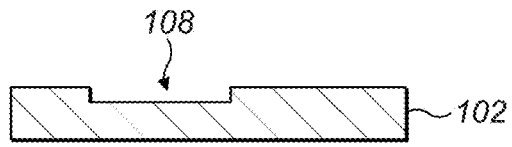
Figure 5:
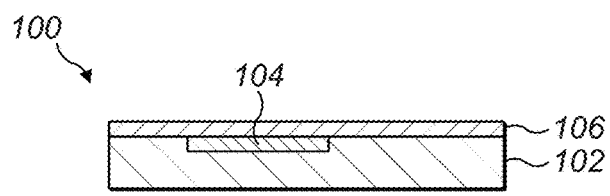

Referring to FIGS. 3 to 9, a wafer constituting the substrate 102 is obtained (Step 200) from silicon grown using any suitable growth technique (FIG. 3). A recessed position or recess 108 defining an open sensor element cavity position is then formed (Step 202) in the substrate 102 (FIG. 4) using, in this example, a surface micromachining technique. However, the skilled person will appreciate that other semiconductor processing techniques can be employed to form the recess 108, for example using any suitable etching technique, such as a chemical etching technique. It should also be appreciated that although in this example a single recess is described as being formed in the substrate 102, more than one recess can be formed in the substrate 102.

Thereafter, the membrane 106, which in this example is ground and polished from a thicker initial silicon wafer separately, is then disposed (Step 204) fixedly adjacent the substrate 102 (FIG. 5), for example by way of bonding using any suitable technique, for example a MEMS wafer bonding technique, such as fusion bonding, anodic bonding, glass frit bonding, or eutectic bonding, thereby closing the recess 108 and hence forming the closed cavity 104. The membrane 106 is applied to the substrate 102 so that the cavity 104 formed comprises a vacuum therein, for example by applying the membrane 106 to the substrate 102 in a vacuum.

In another embodiment, the pressure sensor element 100 can be formed by providing an initial silicon wafer having a first side and an opposite second side. The silicon wafer is etched from the first side to form an open cavity therein. The silicon wafer is etched sufficiently deeply to leave only a thin layer of a region of the wall of the silicon substrate at the second side of the silicon wafer. This thinned backside wall constitutes an integrally formed membrane. A glass wafer is then bonded to the open first side of the etched silicon wafer to close the open cavity, for example using an anodic bonding technique. During fabrication, piezo-resistors can be defined on the second side prior to etching so that the piezo-resistors are disposed on the exterior of the pressure sensor element 100 on the thin layer of the region of the wall of the silicon substrate.

Figure 6:
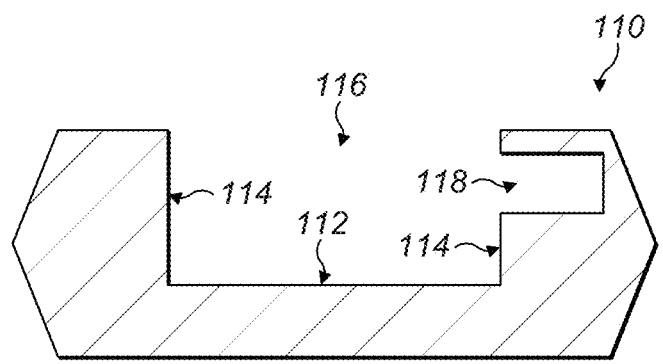
FIG. 6 is a schematic diagram of a package constituting an embodiment of the invention.

Referring to FIG. 6, the pressure sensor element 100 is a first part of the pressure sensor device. In this regard, a second part is a device package 110. In this example, the package 110 comprises a base 112 and side walls 114. The side walls 114 extend away from the base 112 and are, in this example, substantially perpendicular to the base 112. However, the skilled person should appreciate that the side walls 114 need not extend away from the base 112 substantially perpendicularly, but can extend away at other angles, for example between about 70° and about 90°. The base 112 and the side walls 114 are arranged so that the package 110 comprises an open cavity 116 therein for allowing fluid communication with an internal volume of the open cavity 116. In this example, the open cavity 116 is larger in area than an adjacent surface of the pressure sensor element 100, for example an outer surface 107 of the membrane 106. The area of the open cavity 116 can therefore be, for example, up to about 50 times larger than the area of the adjacent surface of the portion of the pressure sensor element 100 residing in the open cavity 116, such as up to about 10 times larger. The depth of the open cavity 116 can be between about two and five times the thickness of the pressure sensor element 100. The volume of the open cavity 116 is not significantly larger than the volume of the portion of the pressure sensor element 100 residing in the open cavity 116 in order to limit the pressure applied to the base 112 and/or side walls 114 of the package 110. In this regard, the volume of the open cavity 116 can be, for example, up to 250 times larger than the volume of the portion of the pressure sensor element 100 residing in the open cavity 116, for example 20 times greater. The force applied to the body of the package 110, for example the base 112 and the side walls 114, is therefore limited so as to avoid damage to the package 100. One of the side walls 114 comprises, when completed, a concave portion, for example a side recess 118, formed therein. The side recess 118 is, in this example, substantially hyperrectangular in form and arranged to receive a part of the pressure sensor element 100 snugly therein.

Of course, the skilled person will appreciate that whilst a substantially hyperrectangular open cavity structure has been described above, the open cavity 116 can possess a different form, for example the open cavity 116 can be a blind bore.

Figure 7:
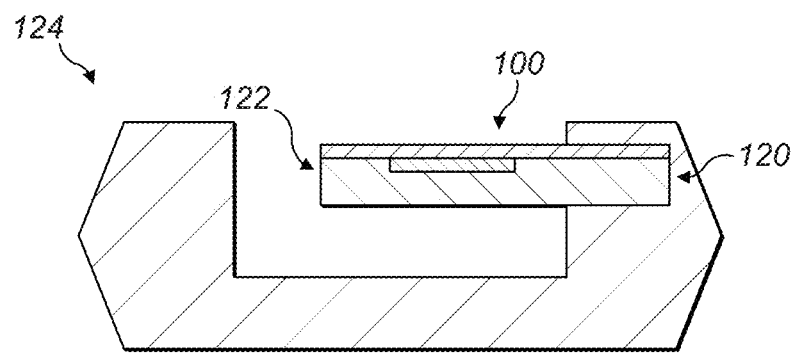
FIG. 7 is a schematic diagram of a pressure sensor device constituting an embodiment of the invention.
Figure 8:
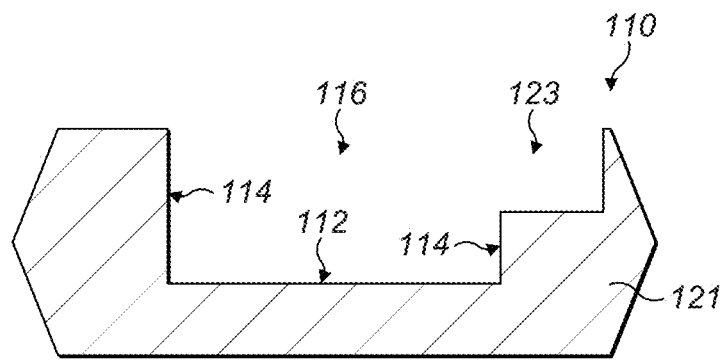
FIG. 8 is a schematic diagram of a part-formed package to receive the pressure sensor element constituting another embodiment of the invention.
Figure 9:
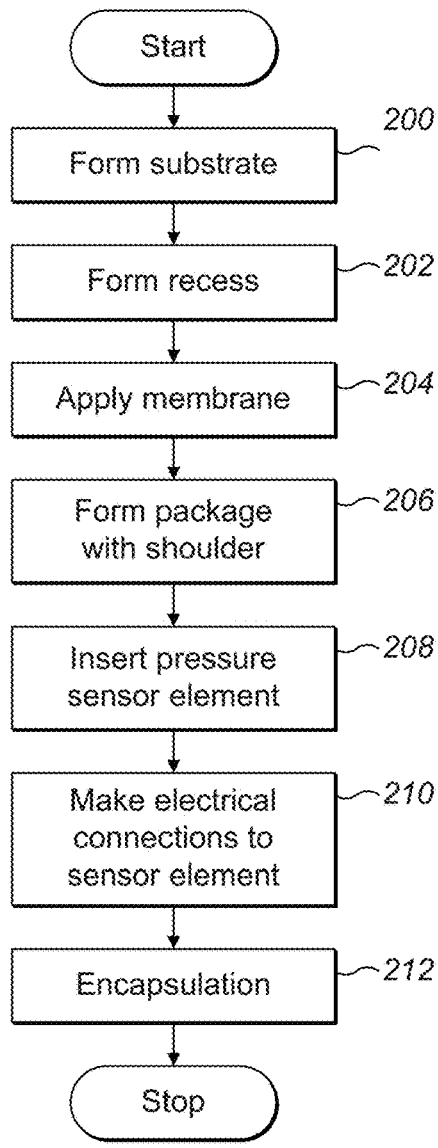
FIG. 9 is a flow diagram of a method of forming the pressure sensor device of FIG. 7 constituting another embodiment of the invention.

Referring to FIG. 7, the pressure sensor element 100 of a pressure sensor device 124 has a proximal end 120 and a distal end 122 with respect to the side wall comprising the side recess 118 in which the pressure sensor element 100 is ultimately disposed. The proximal end 120 of the pressure sensor element 100 is located in the side recess 118 of the package 110 so that the pressure sensor element 100 is cantilever-suspended from the side wall 114 within the open cavity 116. As such, in this example, the side wall 114 in which the side recess 118 is disposed substantially surrounds the proximal end 120 of the pressure sensor element 100. In this example, the side wall 114 in which the proximal end 120 of the pressure sensor element 100 is disposed, and thus the side recess 118, are formed in two stages. In this regard, one technique to form the pressure sensor device 124 comprises part-forming (Step 206) the device package 110 (FIG. 8) comprising a lead frame (not shown) using any suitable moulding technique, forming the side walls 114 of the device package 110 such that a side wall 121 of the side walls 114 comprises a shoulder 123 therein to receive the pressure sensor element 100. In another example, the side walls 114 can be completely moulded and the shoulder 123 can be formed using any suitable erosion technique, for example drilling. In yet another example, the package 110 can be mounded to comprise a relatively shallow recess therein, and a part of the package 110 can then be eroded further, for example by drilling, to form the side walls 114 and complete the definition of the shoulder 123, by leaving a portion of the shallow recess intact. The proximal end 120 of the pressure sensor element 100 is then disposed (Step 208) on the shoulder 123 of the side wall 121 so that the pressure sensor element 100 extends into the open cavity 116. At this stage, wire bonding is performed (Step 210) to connect electrically the pressure sensor element 100 to, for example, the lead frame (not shown) of the device package 110 and/or any other semiconductor device or integrated circuit to be packaged with the pressure sensor element 100. The side recess 118 and the side wall 121 are then completed (Step 212) by applying an encapsulant, for example a glob top, over the proximal end 120 of the pressure sensor element 100. It should be appreciated that this is just one technique for forming the device package 100 with the pressure sensor element 100 therein and other manufacturing techniques can be employed.

In operation, the open cavity 116 enables the pressure sensor element 100 to be exposed to a fluid, for example a medium of which pressure is to be sensed. The pressure sensor element 100 is thus surrounded by a fluid, which in use can be a liquid or gelatinous material. The membrane 106, of course, separates the internal volume of the closed cavity 104 from the fluid under test. In this regard, the internal pressure of the closed cavity 104 constitutes a reference pressure for the pressure senor element 100.

The pressure sensor device 124 is, in this example, an absolute pressure sensor device, which can be employed in relation to various fields of endeavour, for example in an automotive vehicle, such as an automobile.

Figure 10:
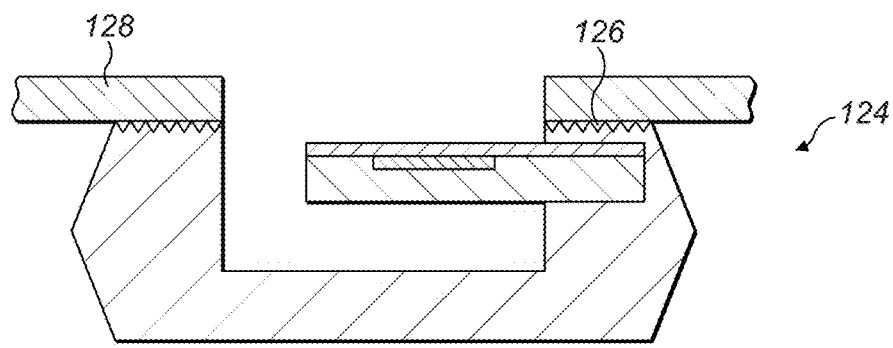
FIG. 10 is a schematic diagram of another pressure sensor device constituting yet another embodiment of the invention.

Turning to FIG. 10, the package 110 comprises a mating surface 126 for fixing to a counterpart mating surface 128 of an element or apparatus to which the pressure sensor device 124 is to be connected or coupled. The mating surface 126 defines the opening of the open cavity 116 of the package 110 and is, in this example, a keying surface. The keying surface can be formed, for example, by roughening the mating surface 126.

The skilled person should appreciate that the above-described implementations are merely examples of the various implementations that are conceivable within the scope of the appended claims. Indeed, it should be appreciated that the pressure sensor element 100 can be formed by techniques other than micromachining techniques. Similarly, the pressure sensor device can be used for applications other sensing absolute pressure.

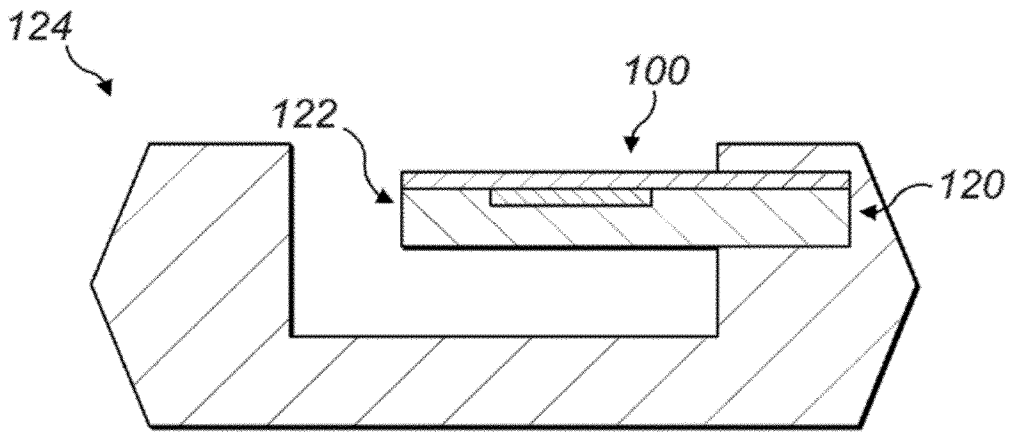

What is claimed is:

1. A pressure sensor device comprising:
    a device package configured to define a cavity having an opening for fluid communication with an internal volume thereof, the cavity comprising a side wall;
    an elongate pressure sensor element having a proximal end and a distal end; wherein
    the side wall is configured to hold fixedly the proximal end of the pressure sensor element therein and
    wherein
    the pressure sensor element includes a closed cavity therein,
    a substrate layer comprising a recessed portion formed therein, the recessed portion defining an open sensor element cavity portion;
    a membrane layer disposed adjacent the substrate layer, the substrate layer and the membrane layer cooperating to close the open sensor element cavity portion and to define the closed cavity; and
    the closed cavity is held fixedly by the side wall so that the pressure sensor element is cantilever-suspended from the side wall within the cavity.

2. The device according to claim 1, wherein the side wall substantially surrounds the proximal end of the pressure sensor element.

3. The device according to claim 1, wherein the pressure sensor element is surrounded by a fluid.

4. The device according to claim 3, wherein the fluid is a liquid or a gelatinous material.

5. The device according to claim 1, wherein the pressure sensor element comprises a closed cavity therein.

6. The device according to claim 5, wherein the pressure sensor element comprises:
    a substrate layer; and
    a membrane layer disposed adjacent the substrate layer, the substrate layer and the membrane layer cooperating to define the closed cavity.

7. The device according to claim 6, wherein the substrate layer comprises a recessed portion formed therein, the recessed portion defining an open sensor element cavity portion.

8. The device according to claim 7, wherein the membrane layer is arranged to close the open sensor element cavity portion.

9. The device according to claim 1, wherein the device package comprises a mating surface for fixing to a counterpart mating surface when in use, wherein the mating surface defines the opening of the cavity of the device package and is a keying surface.

10. The device according to claim 9, wherein the keying surface is a roughened surface.

11. The device according to claim 1, wherein the pressure sensor element is a Micro Electromechanical Systems element.

12. The device according to claim 1, wherein the pressure sensor element is formed from two wafers.

13. The device according to claim 6, wherein the membrane is configured to separate, when in use, an internal volume of the closed cavity from a medium under test.

14. The device according to claim 5, wherein an internal pressure of the closed cavity defines a reference pressure.

15. An absolute pressure sensor device comprising the pressure sensor according to claim 1.

16. An automotive vehicle comprising the pressure sensor device according to claim 1.

17. A method of sensing pressure, the method comprising:
    providing a device package defining a cavity having an opening for fluid communication with an internal volume thereof, the cavity having a side wall, the side wall holding an elongate pressure sensor element fixedly at a first end of the pressure sensor element;
    providing a substrate layer and forming a recessed portion therein to define an open sensor element cavity portion;
    disposing a membrane layer adjacent the substrate layer, the substrate layer and the membrane layer cooperating to close the open sensor element cavity portion and to define a closed cavity; and
    the side wall holding fixedly the elongate pressure sensor element comprising the closed cavity so that the pressure sensor element is cantilever-suspending within the cavity.

* * * * *

UNITED STATES PATENT AND TRADEMARK OFFICE
CERTIFICATE OF CORRECTION

PATENT NO. : 11,169,039 B2
APPLICATION NO. : 16/557213
DATED : November 9, 2021
INVENTOR(S) : Laurent Otte et al.

It is certified that error appears in the above-identified patent and that said Letters Patent is hereby corrected as shown below:

On the Title Page

Please replace title page with the attached title page.

In the Claims

In Column 8, please delete Lines 8-10.

Signed and Sealed this
Thirty-first Day of May, 2022

Katherine Kelly Vidal
*Director of the United States Patent and Trademark Office*

CERTIFICATE OF CORRECTION (continued) Page 2 of 2

(12) United States Patent (10) Patent No.: US 11,169,039 B2
Otte et al. (45) Date of Patent: Nov. 9, 2021

(54) PRESSURE SENSOR DEVICE AND METHOD OF SENSING PRESSURE

(71) Applicant: Melexis Technologies NV, Tessenderlo (BE)

(72) Inventors: Laurent Otte, Brussels (BE); Appolonius Jacobus Van Der Wiel, Duisburg (BE); Jian Chen, Heist-op-den-Berg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 123 days.

(21) Appl. No.: 16/557,213

(22) Filed: Aug. 30, 2019

(65) Prior Publication Data
US 2020/0072692 A1 Mar. 5, 2020

(30) Foreign Application Priority Data
Aug. 31, 2018 (EP) .................................. 18192032

(51) Int. Cl.
*G01L 9/00* (2006.01)
*G01L 19/06* (2006.01)
(52) U.S. Cl.
CPC ......... *G01L 9/0054* (2013.01); *G01L 19/0627* (2013.01)
(58) Field of Classification Search
CPC ............. G01L 19/0627; G01L 19/0654; G01L 19/147; G01L 9/0048; G01L 9/0054
See application file for complete search history.

(56) References Cited

U.S. PATENT DOCUMENTS

| | | | |
|---|---|---|---|
| 6,005,275 A * | 12/1999 | Shinogi | G01L 9/0042 257/417 |
| 6,453,748 B1 * | 9/2002 | Pryor | G01L 9/0042 257/536 |
| 8,852,985 B2 * | 10/2014 | Cai | H01L 29/0649 438/53 |
| 2006/0192974 A1 * | 8/2006 | Li | G01D 5/266 356/496 |
| 2015/0362394 A1 * | 12/2015 | Shimoyama | G01L 9/0001 73/702 |
| 2016/0061677 A1 * | 3/2016 | Han | G01L 9/0045 257/415 |
| 2018/0186623 A1 * | 7/2018 | Vossough | G01L 9/0042 |

FOREIGN PATENT DOCUMENTS

EP 1561724 A1 8/2005
JP 2012154801 A 8/2012

OTHER PUBLICATIONS

European Search Report for European Patent Application No. 18192032 dated May 29, 2019.

* cited by examiner

*Primary Examiner* — Francis C Gray
(74) *Attorney, Agent, or Firm* — Harness, Dickey & Pierce, P.L.C.

(57) ABSTRACT

A pressure sensor device comprises a device package (110) arranged to define a cavity (116) having an opening for fluid communication with an internal volume thereof. The cavity (116) comprises a side wall (114, 115). An elongate pressure sensor element (100) is provided and has a proximal end (120) and a distal end (122). The side wall (114, 115) is arranged to hold fixedly the proximal end (120) of the pressure sensor element (100) therein so that the pressure sensor element (100) is cantilever-suspended from the side wall (114, 115) within the cavity (116).

16 Claims, 3 Drawing Sheets